US007356626B2

(12) United States Patent
Paavilainen

(10) Patent No.: US 7,356,626 B2
(45) Date of Patent: Apr. 8, 2008

(54) METHOD AND DEVICE FOR SIGNAL PROTECTION

(75) Inventor: Risto Paavilainen, Åkersberga (SE)

(73) Assignee: Comex Electronics AB, Taby (SE)

( * ) Notice: Subject to any disclaimer, the term of this patent is extended or adjusted under 35 U.S.C. 154(b) by 0 days.

(21) Appl. No.: 10/477,178

(22) PCT Filed: May 8, 2002

(86) PCT No.: PCT/SE02/00904

§ 371 (c)(1),
(2), (4) Date: May 24, 2004

(87) PCT Pub. No.: WO02/091589

PCT Pub. Date: Nov. 14, 2002

(65) Prior Publication Data

US 2004/0212520 A1 Oct. 28, 2004

(30) Foreign Application Priority Data

May 9, 2001 (SE) .................................. 0101638

(51) Int. Cl.
*G06F 13/12* (2006.01)
*H03K 17/94* (2006.01)
*H03M 11/00* (2006.01)
*H02M 1/12* (2006.01)

(52) U.S. Cl. ........................... 710/62; 341/24; 341/26; 363/39; 363/47; 710/65; 710/67

(58) Field of Classification Search .................. 710/62
See application file for complete search history.

(56) References Cited

U.S. PATENT DOCUMENTS 3,792,466 A * 2/1974 Arnold et al. ................ 341/25
4,035,794 A * 7/1977 Norton et al. ................ 341/24
4,918,445 A 4/1990 Bower
5,297,201 A * 3/1994 Dunlavy ..................... 380/252
5,495,389 A * 2/1996 Dewitt et al. ............... 361/683
5,598,318 A * 1/1997 Dewitt et al. ............... 361/683
6,054,940 A 4/2000 Greene
6,413,103 B1 * 7/2002 Merz et al. ................... 439/98
6,721,423 B1 * 4/2004 Anderson et al. ........... 380/252
6,931,721 B2 * 8/2005 Huang ......................... 29/832

FOREIGN PATENT DOCUMENTS

EP 0 779 715 A2 * 6/1997
EP 0 788 048 A1 8/1997
GB 2 333 883 A * 8/1999

* cited by examiner

*Primary Examiner*—Alford Kindred
*Assistant Examiner*—Richard B. Franklin, Jr.
(74) *Attorney, Agent, or Firm*—Young & Thompson

(57) ABSTRACT

Method for decreasing the existence of externally detectable revealing signals, so-called RÖS, from keyboards (1), e.g. for computers, where the keyboard is fed with signals, so-called matrix signals, which are detected for detection of activity regarding the keys (2) of the keyboard, whereby said matrix signals are generated by means of signal devices. The method is especially characterized in that the matrix signals are high-frequency filtered before they are fed to the keyboard.

18 Claims, 2 Drawing Sheets

A
A
1
2
3
3
3
4
5
6,7,7'
8
9
10
11
12
13
14
15

METHOD AND DEVICE FOR SIGNAL PROTECTION

BACKGROUND OF THE INVENTION

The present invention relates to a method for decreasing the presence of externally detectable revealing signals, so-called RÖS, from keyboards, e.g. for computers, where the keyboard is fed with signals, so-called matrix signals, which are detected for detecting activity regarding the keys of the keyboard, whereby said matrix signals are generated by means of a signal device/signal devices.

The invention also regards a device for carrying out the method.

Earlier, attempts have been made to decrease RÖS from keyboards by a certain encapsulation of the signal devices by means of the keyboard's own encapsulation and by screening of cable devices for the transfer of signals to devices for detection, such as a computer for transformation in a way known per se, to signs, commands or the like, generated by means of the keyboard.

Normally, RÖS do not originate from said matrix signals, which are usually made of signals of certain, comparatively low basic frequencies, basic tones, but from over-frequencies, harmonics, which are generated at the same time as the basic frequencies and which are externally detectable to a considerably greater extent than the basic frequencies. RÖS can also come from digital asynchronous serial signals, which comprise information about activity regarding the keys of the keyboard and are the result of a transformation by means of the signal devices for further transfer to devices for detection, such as a computer. Thus, by means of technique used up to now, one has not been able to decrease the externally detectable signals to an acceptable extent.

However, according to the present invention, the presence of externally detectable signals can be decreased to an extraordinary low level or practically be eliminated.

Thus, the present invention relates to a method according to the introductory part of the attached patent claim 1. The method is especially characterized by what is specified in the characterizing part of said patent claim.

The invention further relates to a device according to the introductory part of the attached patent claim 11. The device is especially characterized by what is specified in the characterizing part of the last mentioned patent claim,

BRIEF DESCRIPTION OF THE DRAWINGS

In the following, the invention will be described in more detail in connection with exemplifying embodiments and the attached drawings, where FIG. 1 schematically shows a first embodiment of a device according to the invention, where the keyboard is shown towards the upper side of its main extension plane, and FIG. 2 schematically shows a section A-A according to FIG. 1.

DESCRIPTION OF THE PREFERRED EMBODIMENTS

Figure 1:
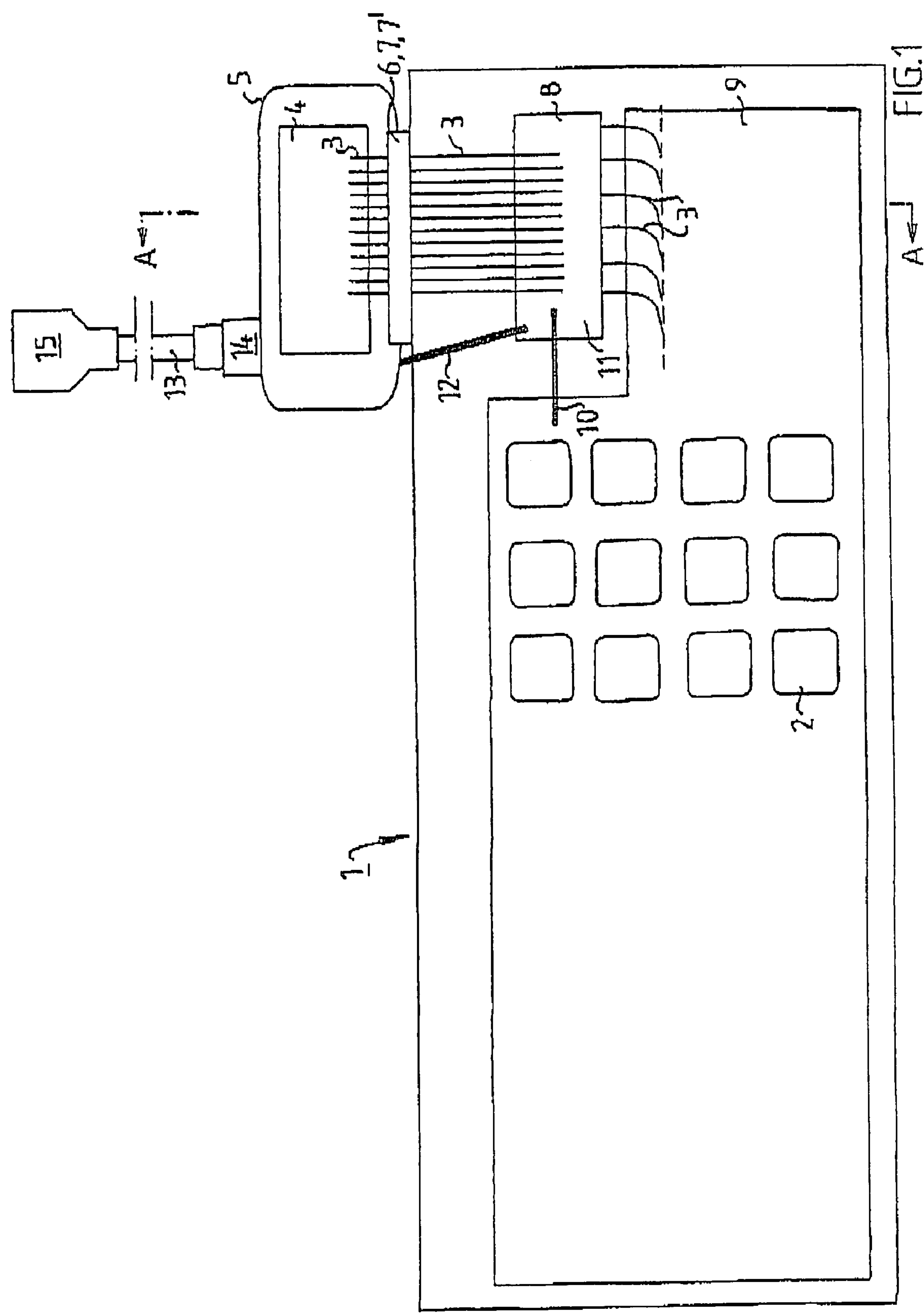
Figure 2:
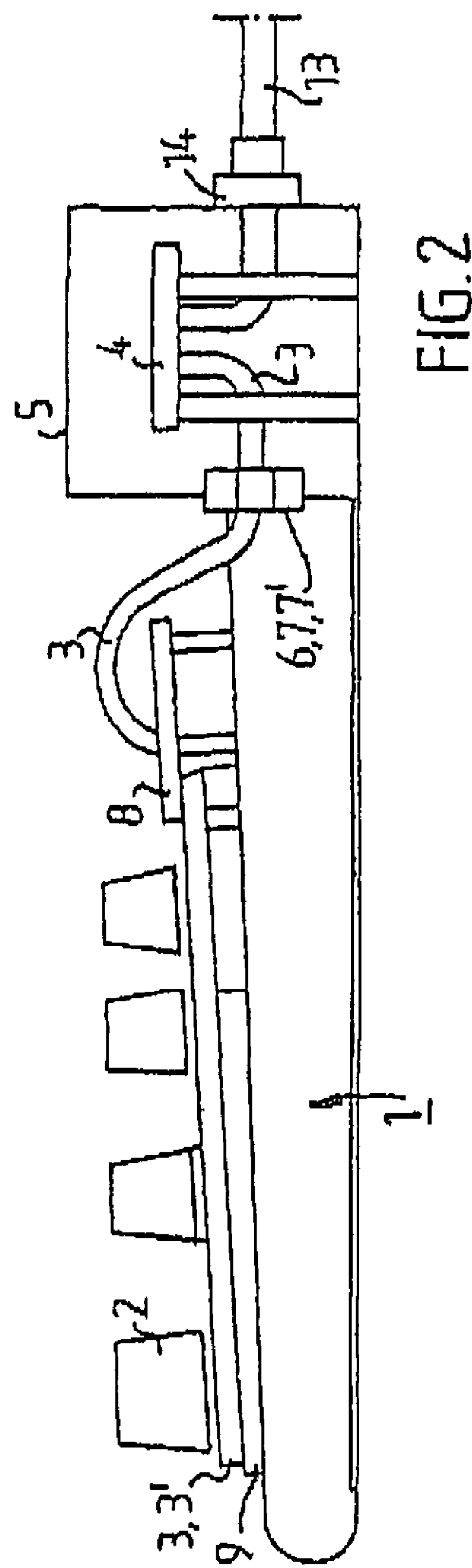

1 in FIG. 1 designates a keyboard with keys 2, shown towards its upper side. Activities regarding the keys of the keyboard are intended to be detected in the usual way by means of, preferably continuous, feeding of the key arrangement with matrix signals via matrix wires 3 and preferably continuous detection of said matrix signals. Here, the matrix wires as well as the key arrangement are shown schematically.

4 designates signal devices arranged for the generation of said matrix signals, where the signal devices preferably are included in an electronics card. The signal devices 4 are arranged in a high-frequency tight container 5, which in the design shown is an external separate unit 5, arranged to be connected to the keyboard via an interface 6 comprising a connector 7 for outgoing matrix signals, to which matrix wires are connected. The connector 7 comprises filter devices 7', arranged to high-frequency filter generated matrix signals as well as digital serial signals so that the harmonics of the signals are strongly attenuated or completely removed. Said digital serial signals are, as mentioned, the result of a transformation of the "response" of the keyboard to matrix signals, where the transformation is intended to be done by means of the signal devices.

According to the embodiment shown, the matrix wires 3 run from the interface to a connection means 8, from which matrix wires run out into the key arrangement, which hereby is arranged to be fed with high-frequency filtered matrix signals. The connection means is intended to replace the connection function of the signal devices, which function cannot be used for the matrix wires when the signal devices are placed in the container 5.

9 designates a metallic earth plane, upon which the key arrangement with matrix wires etc. is placed and which is connected to earth by a good, powerful earth connection 10. According to the design shown, the earth plane is connected to an earth plane 11 of the connection means, which earth plane in its turn is connected to the HF-tight container, by a powerful earth connection 12. According to preferred embodiments, the wires 3 for the matrix signals are preferably carried by means of a plastic foil 3' and arranged close to the earth plane/planes 9, 11, in order to obtain the best earthing effect possible.

For transfer of signals from the keyboard to e.g. a computer, a double-screened cable 13 is provided, which is connected by a connection bushing 14 with a 360° screen connection to the container 5 and arranged to be connected to e.g. the HF-tight chassis of a computer by means of a screened contact means 15 with a 360° screen connection (not shown).

The method according to the invention as well as the function of the device according to the invention should to a considerable extent be obvious from the above.

Externally detectable signals in the form of, primarily, harmonics generated by means of the matrix signals and the serial digital signals of the signal devices are thus screened by means of the HF-tight container 5 and filtered in the interface 6 in order not to be fed into the matrix wires. Remaining harmonics of the signal, which signal is fed to the matrix of the keyboard and which must be digital in order to be interpretable, are screened by means of the earth plane 9 of the keyboard, which earth plane acts as an open screen container. By means of the powerful earth cables 10, 12, screening of such remaining harmonics is done which otherwise could be detected externally. The HF-tight cables 13 and connection means 14, 15 function as an HF-tight extension of the HF-tight chassis of the computer or the corresponding.

Thus, by the arrangement described, a keyboard including connection has been achieved, which substantially does not emit RÖS to a detectable extent Above, the invention has been described in connection with mainly one example of embodiment, Of course, further embodiments as well as minor changes and additions may be contemplated without deviating from the general inventive idea.

Thus, per se, it is conceivable to arrange the screening of the signal devices in the keyboard, i.e. by at least one HF-tight container arranged in the keyboard.

Thus, the invention should not be considered to be limited to the above described embodiments but may be varied within the frame specified by the attached patent claims.

The invention claimed is:

1. A method for decreasing a presence of externally detectable revealing signals from a keyboard of a computer, where the keyboard is fed with matrix signals, which are used to detect activity of keys on the keyboard, whereby said matrix signals are generated by means of signal devices, the method comprising a step of high frequency filtering the matrix signals before being fed to the keyboard, wherein the matrix signals are generated by means of the signal devices in a screening encapsulation, and the high frequency filtering step is performed in an interface between said encapsulation and the keyboard.

2. The method according to claim 1, wherein the interface includes contact means for filtering high frequency signals.

3. The method according to claim 1, wherein the screening encapsulation is arranged as a separate unit, which is connected to the keyboard.

4. The method according to claim 1, wherein a metallic earth plane is arranged in the keyboard and connected to the screening encapsulation.

5. The method according to claim 1, wherein the filtering is of over-frequencies of basic frequencies of the matrix signals.

6. The method according to claim 1, wherein the filtered matrix signals are fed to the keyboard via a connection means.

7. The method according to claim 4, wherein the earth plane of the keyboard is connected to the screening encapsulation via an earth plane of the connection means.

8. The method according to claim 4, wherein wires for the matrix signals are carried by a foil that is adjacent to the earth plane of the keyboard.

9. The method according to claim 1, wherein digital serial signals, comprising information about activity of the keys of the keyboard, are generated by means of the signal devices for further transfer to devices for detection, said digital signals being high frequency filtered in the filtering step.

10. A signal protection device for decreasing a presence of externally detectable revealing signals from a keyboard of a computer, where the keyboard is arranged to be fed with matrix signals, which are used to detect activity of keys on the keyboard and where signal devices are arranged to generate said matrix signals, the device comprising:

filtering devices for high frequency filtering of the matrix signals before the matrix signals are fed to the keyboard; and a screening encapsulation for said signal devices, in which the matrix signals are generated, and an interface between the encapsulation and the keyboard, said filtering devices for high frequency filtering of the matrix signals being provided in said interface.

11. The signal protection device according to claim 10, further comprising a contact means between the keyboard and the screening encapsulation, said contact means comprising said filtering devices.

12. The signal protection device according to claim 10, wherein the screening encapsulation is a separate unit arranged for connection to the keyboard.

13. The signal protection device according to claim 10, further comprising a metallic earth plane of the keyboard, said earth plane is connected to the screening encapsulation.

14. The signal protection device according to claim 13, further comprising an earth plane of said connection means, via which the metallic earth plane of the keyboard is connected to the screening encapsulation.

15. The signal protection device according to claim 13, wherein wires for the matrix signals are carried by means of a foil.

16. The signal protection device according to claim 10, wherein said filtering devices are arranged to filter away over-frequencies of basic frequencies of the matrix signals.

17. The signal protection device according to claim 10, further comprising a connection means, via which filtered matrix signals are fed to the keyboard.

18. The signal protection device according to claim 10, wherein digital serial signals, comprising information about activity regarding the keys of the keyboard, are generated by means of the signal devices for further transfer to devices for detection, said digital signals being high frequency filtered.

* * * * *